US008745143B2

(12) United States Patent
Vitaldevara et al.

(10) Patent No.: US 8,745,143 B2
(45) Date of Patent: Jun. 3, 2014

(54) DELAYING INBOUND AND OUTBOUND EMAIL MESSAGES

(75) Inventors: Krishna C Vitaldevara, Fremont, CA (US); Eliot C Gillum, Mountain View, CA (US); Jason D Walter, San Jose, CA (US); Mehrdad Bidgoli, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 594 days.

(21) Appl. No.: 12/752,775

(22) Filed: Apr. 1, 2010

(65) Prior Publication Data
US 2011/0246583 A1    Oct. 6, 2011

(51) Int. Cl.
*G06F 15/16* (2006.01)

(52) U.S. Cl.
USPC ........... 709/206; 709/204; 709/207; 370/352; 370/356

(58) Field of Classification Search
USPC .................................. 709/204–207; 370/352
See application file for complete search history.

(56) References Cited

U.S. PATENT DOCUMENTS

| | | | |
|---|---|---|---|
| 6,757,830 B1 | 6/2004 | Tarbotton et al. | |
| 7,287,060 B1 | 10/2007 | McCown et al. | |
| 7,293,063 B1 | 11/2007 | Sobel | |
| 7,519,668 B2 * | 4/2009 | Goodman et al. | 709/206 |
| 7,543,053 B2 * | 6/2009 | Goodman et al. | 709/224 |
| 2002/0032727 A1 | 3/2002 | Dias et al. | |
| 2003/0149726 A1 | 8/2003 | Spear | |
| 2003/0225850 A1 | 12/2003 | Teague | |
| 2004/0199592 A1 * | 10/2004 | Gould et al. | 709/206 |
| 2004/0215977 A1 * | 10/2004 | Goodman et al. | 713/201 |
| 2005/0015455 A1 * | 1/2005 | Liu | 709/207 |
| 2005/0015626 A1 * | 1/2005 | Chasin | 713/201 |
| 2005/0060643 A1 * | 3/2005 | Glass et al. | 715/501.1 |
| 2005/0081059 A1 * | 4/2005 | Bandini et al. | 713/201 |
| 2005/0204006 A1 * | 9/2005 | Purcell et al. | 709/206 |
| 2005/0204159 A1 * | 9/2005 | Davis et al. | 713/201 |
| 2005/0240617 A1 | 10/2005 | Lund et al. | |
| 2005/0283519 A1 * | 12/2005 | Turgeman et al. | 709/206 |
| 2006/0010214 A1 * | 1/2006 | McDowell et al. | 709/206 |
| 2006/0026242 A1 * | 2/2006 | Kuhlmann et al. | 709/206 |

(Continued)

OTHER PUBLICATIONS

Wu, "A Multi-Faceted Approach towards Spam-Resistible Mail", Proceedings of the 11th Pacific Rim International Symposium on Dependable Computing, 2005, pp. 208-218, IEEE Computer Society Washington, DC, USA.

(Continued)

*Primary Examiner* — Wing F Chan
*Assistant Examiner* — Razu Miah
(74) *Attorney, Agent, or Firm* — Bryan Webster; Brian Haslam; Micky Minhas

(57) ABSTRACT

A computer implemented system and method to enable protection of email users from unsolicited bulk email using a message delivery delay based on characteristics detected in selected messages. Messages are evaluated for characteristics resembling unsolicited bulk email. A determination is made whether a message passing through the email system exhibits such characteristics and whether to delay the message. Suspect messages may be delayed for a period of time, the delay period being dependent on the characteristics giving rise to a determination to delay. Following the period, additional information received during the delay period characterizing the message is used to determine whether to dispose or deliver the message. Messages evaluated can be inbound to the email system, outbound to other email systems, or moving within the email system.

17 Claims, 6 Drawing Sheets

(56) References Cited

U.S. PATENT DOCUMENTS

| | | |
|---|---|---|
| 2006/0031359 A1 | 2/2006 | Clegg et al. |
| 2006/0031373 A1* | 2/2006 | Werner et al. ............... 709/207 |
| 2006/0041622 A1* | 2/2006 | Qutub et al. ................ 709/206 |
| 2006/0075048 A1* | 4/2006 | Gruper et al. ............... 709/206 |
| 2006/0168031 A1* | 7/2006 | Cai et al. .................... 709/206 |
| 2007/0174402 A1* | 7/2007 | Tomkow ..................... 709/206 |
| 2007/0282955 A1* | 12/2007 | Lin et al. .................... 709/206 |
| 2008/0114843 A1* | 5/2008 | Shinde et al. ............... 709/206 |
| 2009/0055491 A1* | 2/2009 | Agarwal et al. ............. 709/206 |
| 2009/0055502 A1* | 2/2009 | Agarwal et al. ............. 709/207 |
| 2009/0063371 A1 | 3/2009 | Lin |
| 2009/0157708 A1* | 6/2009 | Bandini et al. .............. 707/100 |
| 2010/0058178 A1* | 3/2010 | Dong et al. ................. 715/256 |
| 2010/0077052 A1* | 3/2010 | Alsop et al. ................. 709/206 |
| 2010/0088765 A1* | 4/2010 | Lund et al. .................. 726/22 |
| 2011/0145922 A1* | 6/2011 | Wood .......................... 726/24 |

OTHER PUBLICATIONS

Twining, "Email Prioritization: Reducing Delays on Legitimate Mail Caused by Junk Mail", USENIX Annual Technical Conference, Proceedings of the annual conference on USENIX Annual Technical Conference, 2004, pp. 4, USENIX Association Berkeley, CA, USA.

* cited by examiner

DELAYING INBOUND AND OUTBOUND EMAIL MESSAGES

BACKGROUND

One of the most common forms of email is provided by Email Service Providers (ESPs) such as Yahoo! Mail, Microsoft Hotmail, Google GMail, and other web-based email services. In large scale ESPs, the problem of unwanted bulk email messages (UBE), or also known as spam, is acute. Providers use a number of techniques in an effort to shield users from receiving UBE.

Additionally, ESPs may themselves be unwilling conduits for UBE senders. Spam senders constantly derive new and different methods of both usurping inbound message safeguards, and efforts by ESPs to thwart spammers using their systems as conduits for SPAM. UBE senders may, for example, change the characteristics of their emails to usurp spam email filters as such filters learn the characteristics of specific messages. In addition, spammer may try to send large volumes of messages within a short period of time so that the maximum number of messages bypass spam filters before being detected.

SUMMARY

Technology is provided to enable protection of email users from unsolicited bulk email using a message delivery delay based on characteristics detected in selected messages. A message classifier is provided on one or more processing devices and evaluates characteristics of messages passing through an email system. Messages evaluated can be inbound to the email system, outbound to other email systems, or moving within the email system. The classifier determines whether to delay messages which are not clearly UBE for a delay period in order to obtain additional information about the message to more accurately determine how to dispose of a message.

In one embodiment, the technology is a computer implemented method for safeguarding users from unsolicited bulk email. The method is performed in an email system and monitors messages passing through the email system. A determination is made whether a message passing through the email system exhibits characteristics resembling unsolicited bulk email and whether to delay the message. Suspect messages may be delayed for a period of time, the delay period being dependent on the characteristics giving rise to a determination to delay. Following the period, additional information received during the delay period characterizing the message is used to determine whether to dispose or deliver the message.

DETAILED DESCRIPTION

Technology is provided to enable protection of email users from unsolicited bulk email using a message delivery delay based on characteristics detected in selected messages. A message classifier is provided on one or more processing devices and evaluates characteristics of messages passing through an email system. Messages evaluated can be inbound to the email system, outbound to other email systems, or moving within the email system. The classifier determines whether to delay messages which are not clearly UBE for a delay period in order to obtain additional information about the message to more accurately determine how to dispose of a message.

Figure 1:
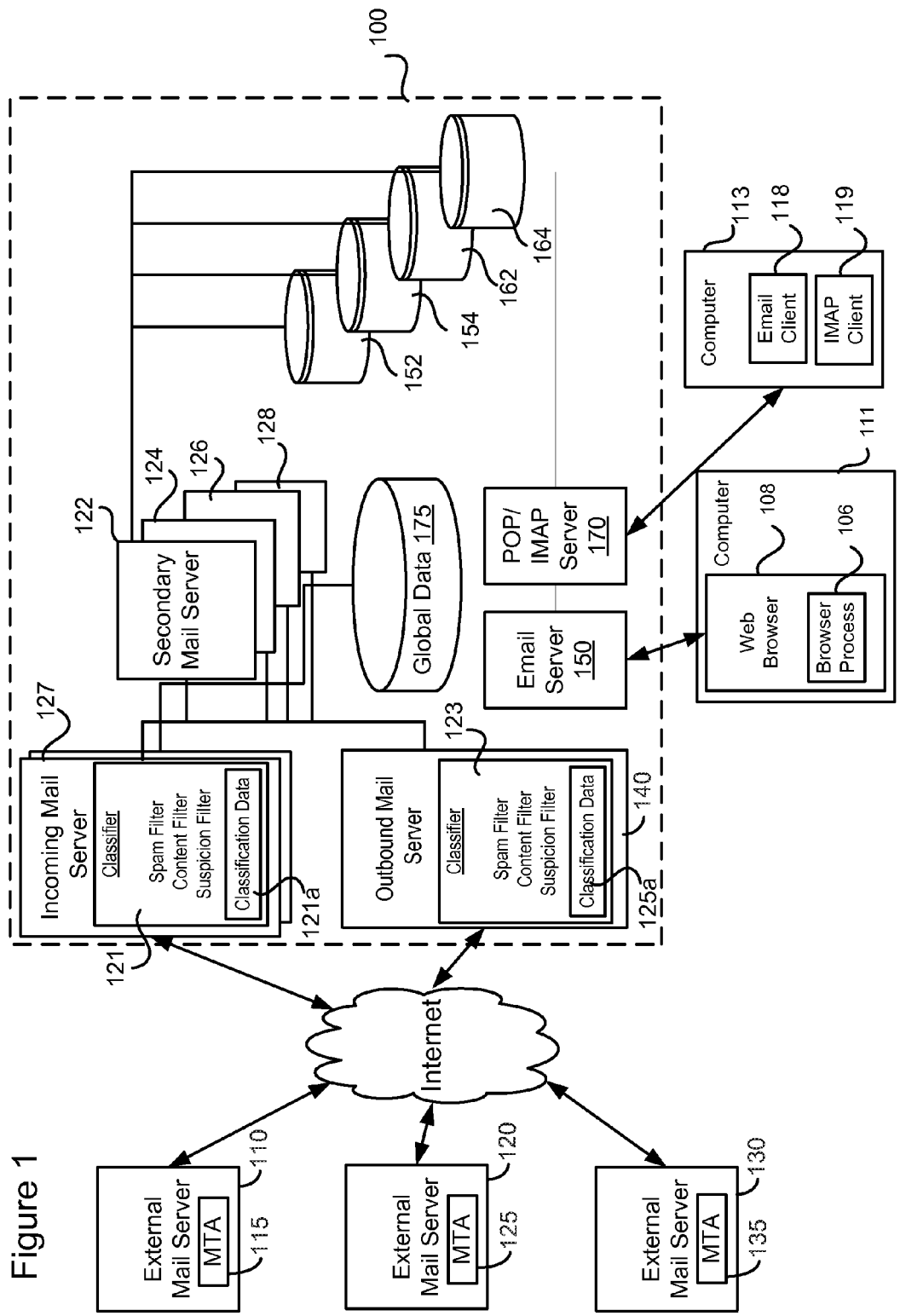
FIG. 1 is a block diagram of an email system suitable for implementing the present technology.
Figure 6:
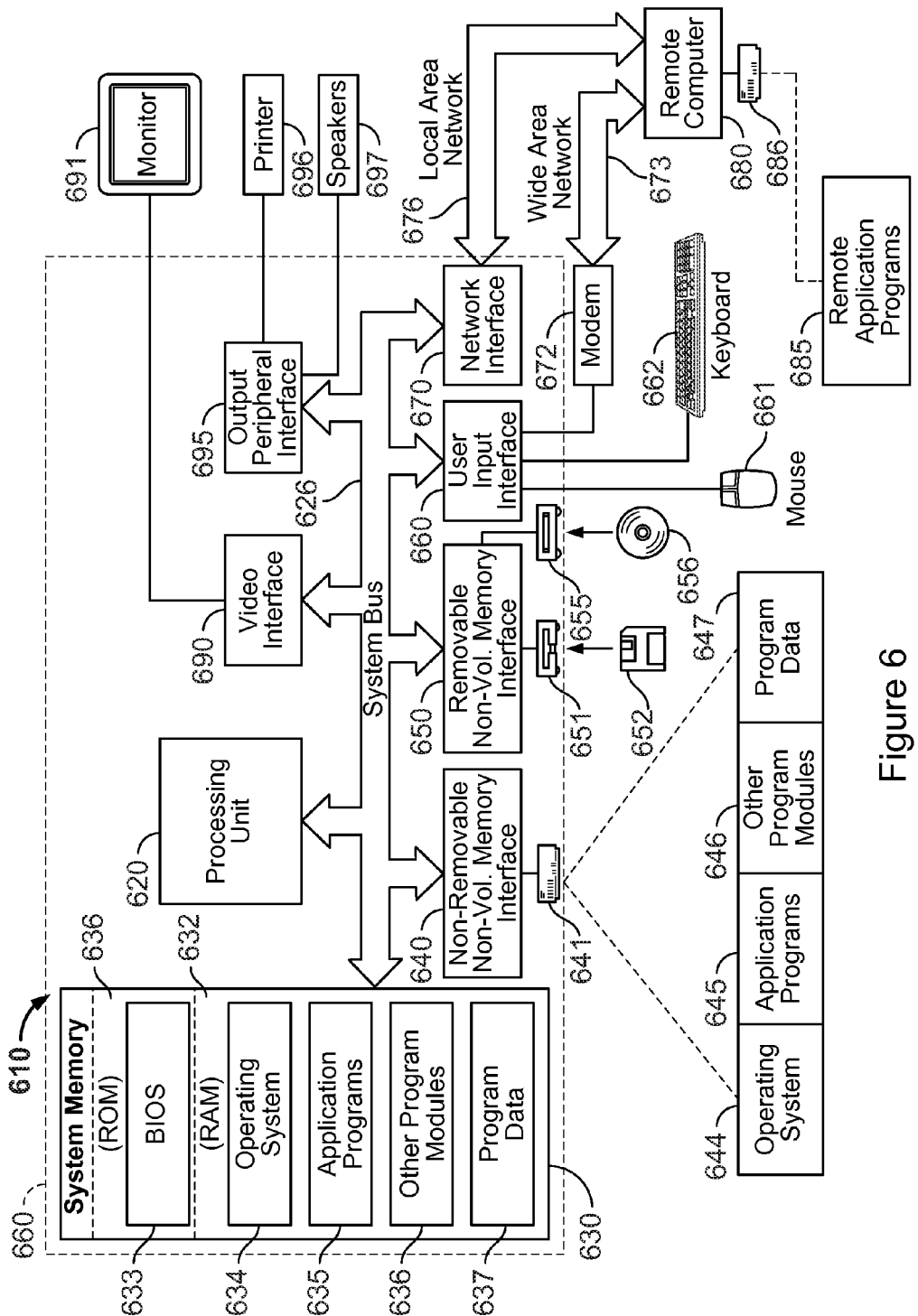
FIG. 6 illustrates a processing device suitable for implementing the present technology.

FIG. 1 illustrates a simplified view of a distributed email system 100 in which the technology may be implemented. The system uses a number of computing devices. Although the technology will be described with respect to a distributed email system, it will be recognized that the techniques described herein may be advantageously applied to an individual email processing device or server. An exemplary computing device for implementing any of the servers shown in FIG. 1 is shown in FIG. 6.

FIG. 1 is a block level diagram of a system 100 suitable for implementing the present technology. System 100 is designed to allow users operating processing devices 111, 113 to access email messages processed and stored by system 100. It will be understood that processing devices 111, 113 may be implemented by a processing devices as illustrated in FIG. 6 as well as various other processing devices, including mobile phones.

System 100 may consist of, for example, an inbound email server or mail transfer agent (MTA) 127 and outbound email server 140. Each of the inbound and outbound servers may comprise a number of processing devices. The inbound and outbound servers transmit receive messages to and from the system 100 and various external entities 110, 120, 130 each having their own mail transfer agents servers, 125, 135, respectively. System 100 may further comprise secondary servers 122, 124, 126, 128 and user data storage units 152, 154, 162, 164. Secondary servers work within system 100 to route mail to user storage and between users in the system 100. User data storage units 152, 154, 162, 164 store message data for individual users of the system in designated locations. An email server 150 and a POP/IMAP server 170 may also be provided which allow users to access their email data after an appropriate authentication. System 100 allows users operating processing devices 111, 113 to access their email data. It should be understood that devices 111, 113 may connect to system 100 via any number of public or private networks, including the Internet. Similarly, inbound server 127 and outbound server 140 communicate with external entities 110, 120, 130 using any number of public or private networks, including the internet.

In a distributed system such as system 100, workload may be shared processing devices with the workload divided into separate functions. Inbound email server 127 is a front end or "edge" server to which emails transmitted via the Internet from a sending server 115, 125, 135 to the system 100 are directed. The inbound server 127 handle7 connections from sending server 115, 125, 135 and performs an initial set of acceptance and filtering tasks on inbound email. Inbound email server 127 conducts an initial protocol and blacklist check to determine whether to allow an initial connection from the sending server servers 115, 125, 135.

Similarly, outbound server 140 may handle functions of forwarding email messages from users of the email system to recipients outside the email system 100. Outbound server 140 handles lookup and connection tasks to route mail to external servers 110, 120, 130, and associated servers 115, 124, 135, respectively. The inbound and outbound servers functions may be combined on a single device.

Each of the incoming mail servers 100 and outbound mail servers 140 may include a classifier 121, 125 including, for example, a spam filter, a content filter and a suspicion filter. In one embodiment, classifiers may also be provided on internal mail servers 122, 124, 126, 128. Classifiers 121, 125 may be enabled by instructions to program one or more processing devices or servers to complete the operations described herein. The technology is described in terms of flow diagrams to describe either the structure or the processing of certain embodiments to implement the systems and methods of technology. Using the diagrams in this manner to present the technology should not be construed as limiting of its scope. The present technology can also be used with any special purpose computer or other hardware system and all should be included within its scope.

The classifier 121, 123 evaluates message to determine whether one or more known characteristics of a message (inbound, outbound or moving within the system) is a characteristic of UBE. Certain types of message are clearly spam or phishing messages while others may exhibit one or more characteristics which indicate the message may or may not be UBE. The classifier evaluates the message to determine whether to deliver the message either to a system user (in the inbound case) or to an external server (in the outbound case), or, in accordance with the technology herein, to delay the message to allow additional feedback to be received during a delay period, after which further processing may occur.

For inbound messages, classifier 121 may apply a global spam filter which uses known heuristic techniques to associate a spam score with each message. Similarly, the global content filter may comprise any of a number of content filtering methods including for example, methods to determine if the message contains phishing content, suspect links or viral attachments, and may associate a phishing score with a message. Using one or more of the criteria in the global spam filter and/or the global content filter, the inbound email drtbrt makes an initial determination as to whether the message should be delivered to a user. In one embodiment, a message failing one or more tests at the inbound server will automatically deleted before ever reaching a user inbox. The global spam/content filter may assign a spam likelihood score to each message and/or flag the message as a potential phishing email. The suspicion filter, described below, determines whether inbound or outbound messages are potentially nefarious, and can act on the messages as described below.

In one embodiment, one, either or both of the indications of the spam filter and the content filter may be sufficient to make a determination on whether the inbound message should be delivered or disposed. However, in other cases, the outcome of the spam filter and content filter will not be determinative, or may not be subject to missing UBE when spammers change in message characteristics.

Each classifier may evaluate messages not marked as clearly UBE by a spam filter and content filter. Each classifier 121, 125 may include a local data store 121*a*, 125*a*, of characteristic information that is updated and provides feedback to a global database 175. The characteristics include data about messages which may be considered to be a potential indicator that the message is UBE. A global characterization database 175 may include information culled from various sources within and outside of email system 100. Global database 175 may receive, for example, feedback from each of the edges servers when email having a given characteristic is seen multiple times. In addition, global database may include centralized information for the spam and content filters which is constantly updated from sources internal to system 100 and external to system 100, such as commercial spam filtering services.

If an inbound message is deemed deliverable, the inbound email server will forward messages to a second level, internal server 122, 124, 126, 128. Information on where to direct messages within the system may be provided by a user location database (not shown) which is a data store of storage location information for each of the users having a user account or email address within system 100. The user location database server stores information for allowing other servers in the system to direct mail within the system to storage locations on storage units 152, 154, 162, 164 based on the routing instructions in the system 100.

In one embodiment, communication between the inbound server 121, outbound server 125 and the internal servers 122, 124, 126, 128 is performed using simple mail transfer protocol (SMTP) protocols. The internal servers 122, 124, 126, 128 include instructions to parse email for storage on storage units 152, 154, 162, 164. Routing between the inbound systems 121 and internal systems 122, 124, 126, 128 may be performed using internal routing records for the system 100. Such information can be used by the inbound server 121 to route email within the system 100 after the inbound server 121 determines a user's storage location from a user data store (not shown). In accordance with the present technology, the inbound email server 121 uses standard principles of SMTP to determine the delivery location in data storage units for a given user and route an incoming email to either the data storage units or a spooler by accessing MX records present the user data store which provide a user's routing domain. This allows convenient routing and customization of the internal structures in the ESP for various purposes, as described below. In addition, other information about where to send and store email data may be encoded in the internal MX record.

Access to user data by the users is supported by the email server 150 or POP/IMAP server 170. Email server 150 may comprise a web server which provides an email interface to a web browser 108 which institutes a browser process 106 on a user computer 112. Email server 150 can render email data from the data storage units to a user using computer 112 to access the email system 100. Likewise POP/IMAP server 170 can provide email data to a POP email client 118 or an IMAP client 110 on user computer 113.

It will be recognized that classifiers may be further be provided at any of the internal mail servers illustrated within system 100. This allows messages transmitted between users having accounts with the system to be evaluated.

Figure 2:
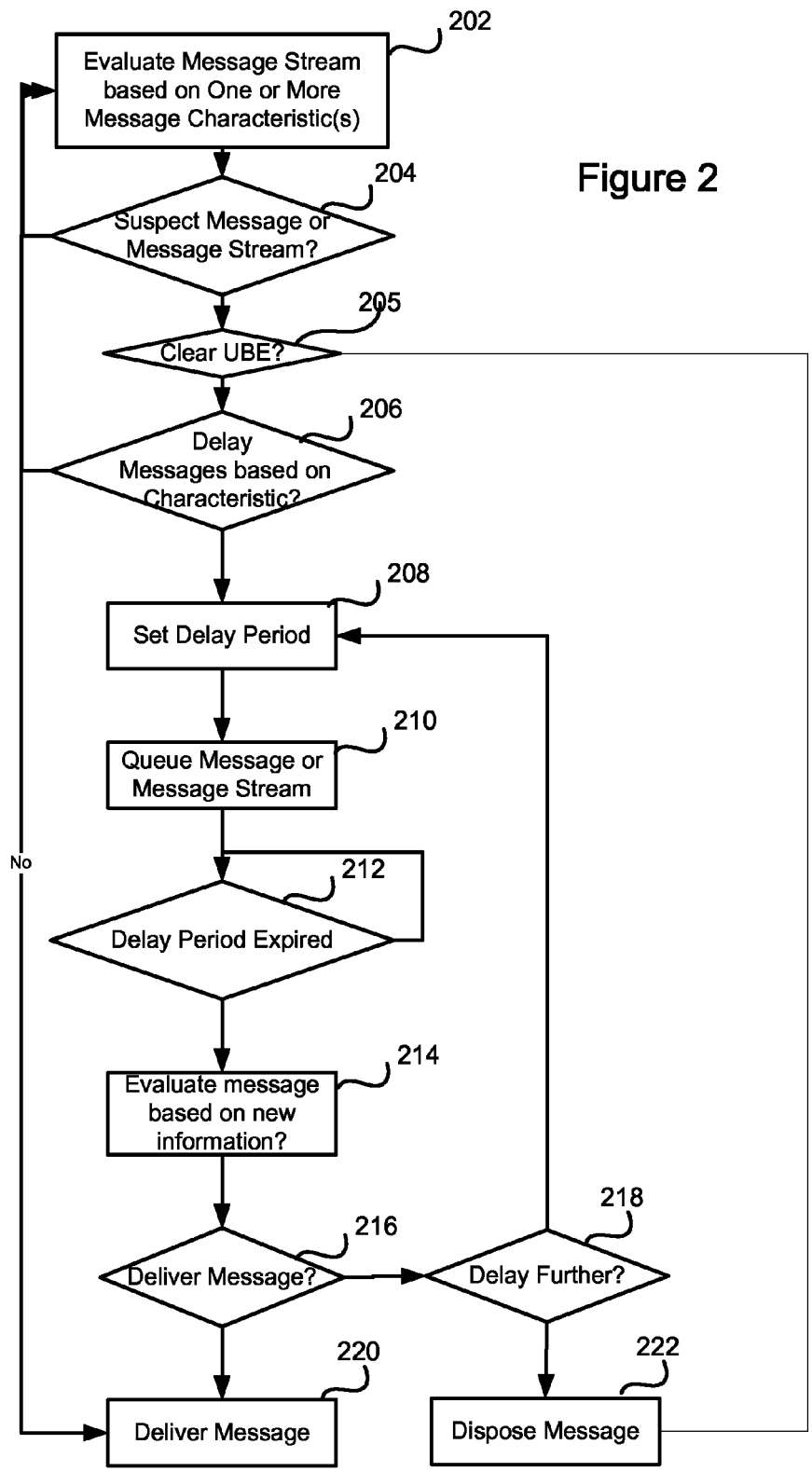
FIG. 2 is flowchart illustrating a method one embodiment of the present technology

FIG. 2 illustrates a method performed by the technology of the present technology. At 202 one or more messages passing through system 200 are evaluated based on a number of characteristics such as those described briefly above and further illustrated below in FIG. 5. The evaluation may be performed on all messages, or a fraction of the messages in the system. Evaluated messages may be selected based on filtering for specific characteristics or selected randomly. In a distributed system such as that illustrated in FIG. 1, the evaluation may be performed by a classifier on any of a number of inbound, outbound or internal servers within system 100.

The evaluation at 202 determines whether the message exhibits characteristics similar to other UBE messages. Characteristics which trigger whether the message is suspect can be defined by an administrative entity controlling system 100, defined by deterministic means, or defined randomly. At 204, a decision is made as to whether the characteristics flagged at 202 are sufficient to classify the message as UBE. If not, the message may be delivered at 220. If the message is suspicious because it contains a match to one or more defined UBE characteristics, it may be clearly UBE and if so at 205, the message may be disposed of at 222. Step 205 may result from a spam filter or content filter determining that the message is over a score threshold, or from the classifier determining that it contains enough UBE matching characteristics that the message is clearly UBE and should be disposed of. Disposal step at 222 may be any of a number of processes including deleting the message before it reaches user storage, placing the message in user storage in a location accessible by the user, such as a SPAM folder, or any of a number of operations consistent with providing a superior user experience.

If the message is not clearly UBE at 205, but has exhibited suspect characteristics, at 206, a determination is made as to whether to delay the messages. The determination at 206 may be made by any number of techniques based on the characteristics. A weighted sum of known versus unknown UBE message characteristics is used in one embodiment to determine whether to delay a message. If no decision to delay is made at 206, the message may be delivered or otherwise disposed of.

If a decision to delay the message is made, at 208 a delay period is set. The delay period may be the same for all messages or may vary based on the characteristics of one message or several messages. For example, messages from suspected email source and having a higher spam score may be delayed for a longer period than those from a new email source but having the same spam score. The delay period may be set for an individual message or a group of messages sharing one or more of the same characteristics.

At 210, the delayed messages are queued rather than passed on for delivery. Queuing may occur for both inbound messages and outbound messages. Queuing may take any number of forms including holding the messages in a dedicated storage queue on the inbound message server 120, the outbound message server 140, or the secondary message servers 122-128. Queuing may occur by delivering the message to a dedicated queue on the storage systems 121, 154, 161, 164, or in user storage locations such as a SPAM or deleted mail folder.

Queuing may occur in message streams by refusing delivery of additional messages having similar or identical characteristics to one or more evaluated messages.

At 212, the method waits for the expiration of the delay period. During this period, additional information may be added to the global database 175 and may be distributed by the global data store. The additional information may comprise updated spam and content filter information as well as feedback from system users who receive messages having similar characteristics. Such feedback can be stored for use in re-evaluating delayed messages at the end of the expiration period.

At 214, at the expiration of the delay period, the message or messages are re-evaluated using updated information in the classifier. It should be understood that the characterization and evaluation steps may be performed at any of a number of servers within system 100. Information from the global database may be pulled from the data store by the At 216 a determination is made on whether to deliver the message based on the re-evaluation after new information is received at 214. If so, the message may be delivered at 220. If not, a determination may be made at 218 to further delay the message. If so, the method returns to step 208 and awaits additional information. If not, the message is disposed of at 222. It should be understood that the delivery 220 and disposal 222 steps may comprise any of a number of alternative actions. For example, delivery may involve delivering the message to an internal user with an indication that the message may be suspect, or may involve connecting to one or more external servers to deliver a message.

The delay period may be set within parameters defined by protocol standards and by the system administrator. For example, system users may have an expectation of message delivery within a reasonable time period, so delays of several minutes may not be acceptable. Similarly, the Request for Comments (RFC) RFC 1132 by the Internet Engineering Task Force (IETF) specifies suggested timeouts for SMTP message responses. These and other standards factors may limit delay times.

Figure 3:
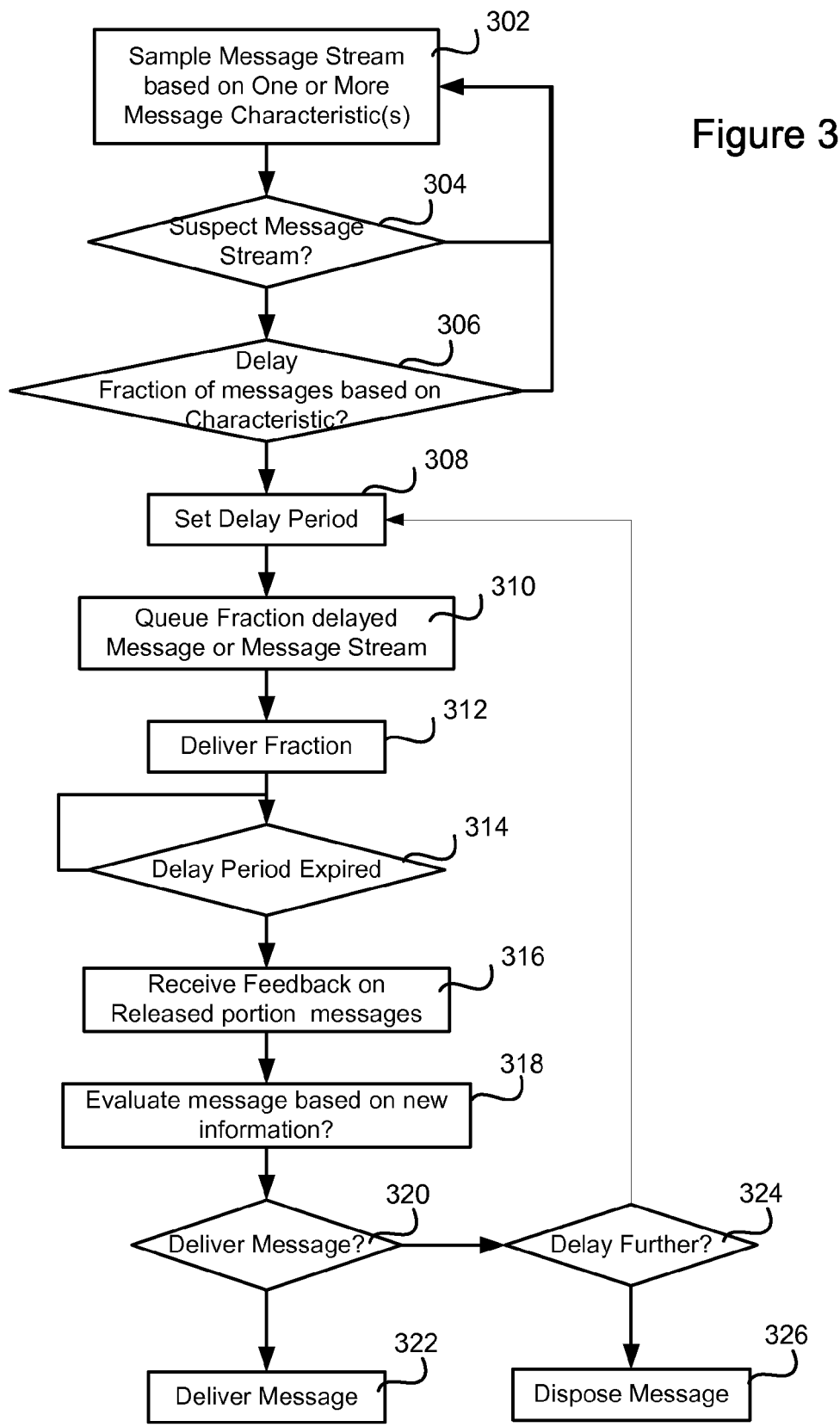
FIG. 3 is a flowchart illustrating a second embodiment of the present technology.

FIG. 3 illustrates a second implementation of the present technology wherein a stream of messages is sampled. In the context of this description, a large volume of messages should be understood to be passing through an ESP such as that indicated in FIG. 1. At 302 messages are continually evaluated by classifiers residing on various components in the system.

Information may be broadcast form the global database 175 to each of the classifiers indicating which types of characteristics is of potential interest and whether messages having some or all of the characteristics should be delayed.

At 304, if a plurality of messages matching suspect characteristics of interest is detected, a decision may be made to delay all or a portion of the messages matching the suspect characteristics. A delay period is set at 308. Optionally, all messages matching one or more specified characteristics is delayed. In an the illustrated implementation, a fraction of the messages are delayed at 310, while the remainder of messages in the stream are delivered at 312.

At 314, the delay period runs and at the expiration of the delay period, feedback from message delivery is received at 316. At 318, messages in the non-delivered fraction of the stream are re-evaluated based on the feedback received at 316. If the feedback indicates the messages should be delivered, then a decision to deliver the messages will be made at 320. Feedback may consist of users acting on the messages delivered by marking the message as SPAM or by deleting the messages. Outbound feedback may be provided where external servers return a large percentage of non-delivery receipts for delivered messages.

At 322 the messages may be delivered or further delayed at 324 or disposed of at 326.

Figure 4:
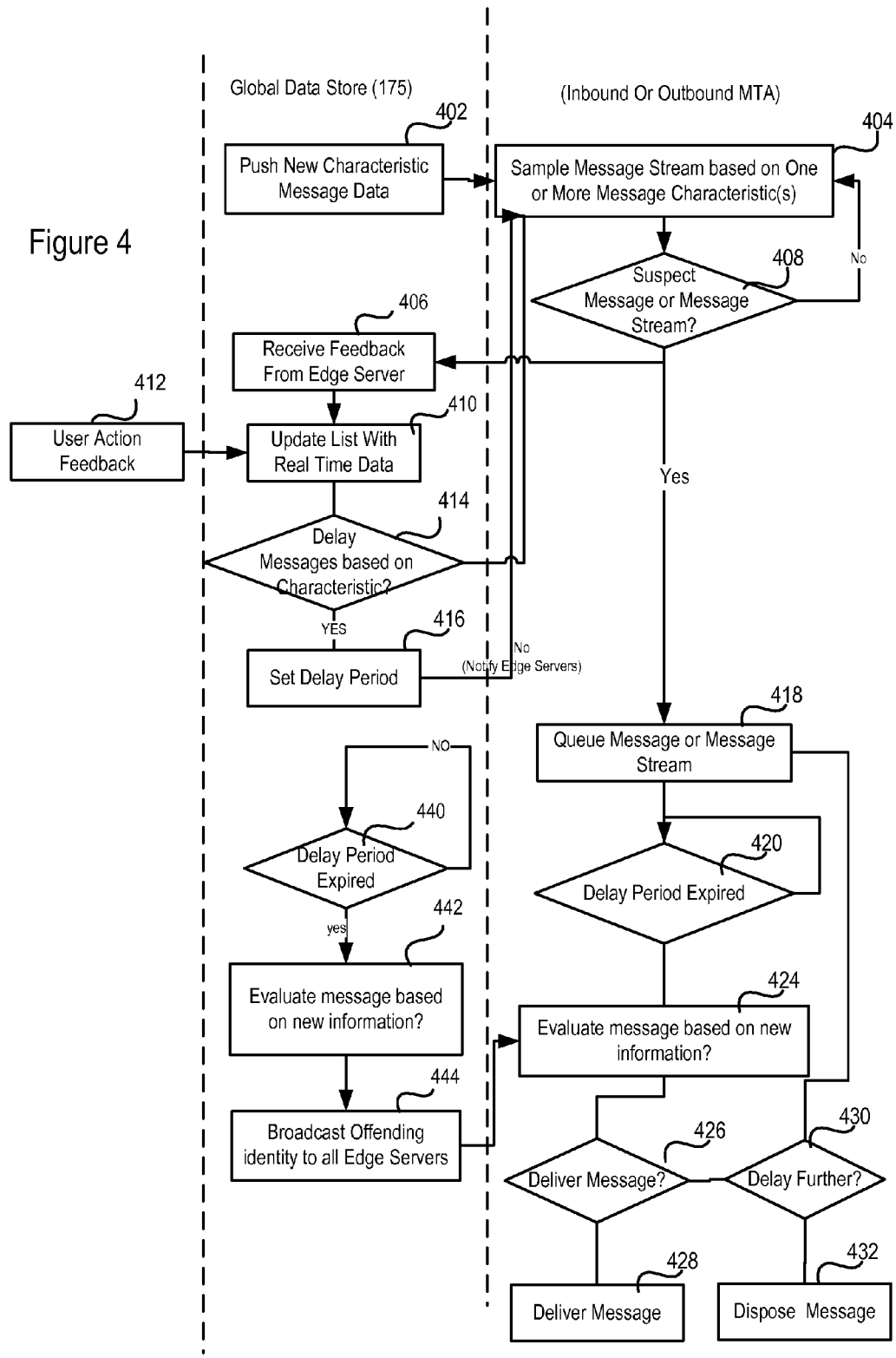
FIG. 4 is a flowchart illustrating a third embodiment of the present technology

FIG. 4 illustrates one embodiment of a method performed by one or more servers having a classifiers, such as edge servers 121, 140, and the global database 175. FIG. 4 illustrates the method of FIG. 1 when performed in a distributed system.

New charactering information is received at the global database and provided to characterizers on edge servers at 402. Characterizing information may be provided by an administrative entity, spam filtering information generated by system 100 or third party services, phishing email information generated by system 100 or third party services, user feedback, or any number of such sources. The method of providing information from the global database 175 to other servers may be any of a number of standard techniques including using network broadcasting techniques, message based transmission of new data files, or other push or pull techniques to and from the edge server. New messages encountered by the edge or internal servers are evaluated at 404. When a suspect message is encountered at 408, information is returned to the global database indicating the presence of the suspect message and local action is taken at 418.

Information in the global database is updated both with feedback received from the edge servers 406 and user action feedback 412. All feedback is used to update characteristic information at 410. At 414, the global database 175 may make a determination that messages matching certain characteristics should be subject to a delay in processing for further evaluation. If no delay for certain characteristics is required, this information may be returned to the edge/internal servers at 404. If a delay is required, at 416, the delay period may be set by the global database 175, and the edge servers notified at 404.

When a suspect message is encountered at 408, the message will be queued at 418 for the delay period determined at 416. Once the delay period expires at 420, the message may be evaluated with new information at 424. A parallel evaluation may occur at the global database 175 at steps 440 and 442. The global database may have access to more information about messages encountered in different parts of the system and therefore provide additional information to edge servers in making a determination of how to dispose of the message at 424 and 444. When a parallel update occurs after a delay period 440, updated information from the global database 175 may be provided to the edge servers at 444. Instructions provided at steps 424 and 444 may include an indication of whether the edge server may ultimately release the message based on its own determination or await additional information from the global data store. Based on the evaluation at 424, a decision is made at 426 to deliver the message at 428, further delay the message at 430 or dispose of the message at 432.

Figure 5:
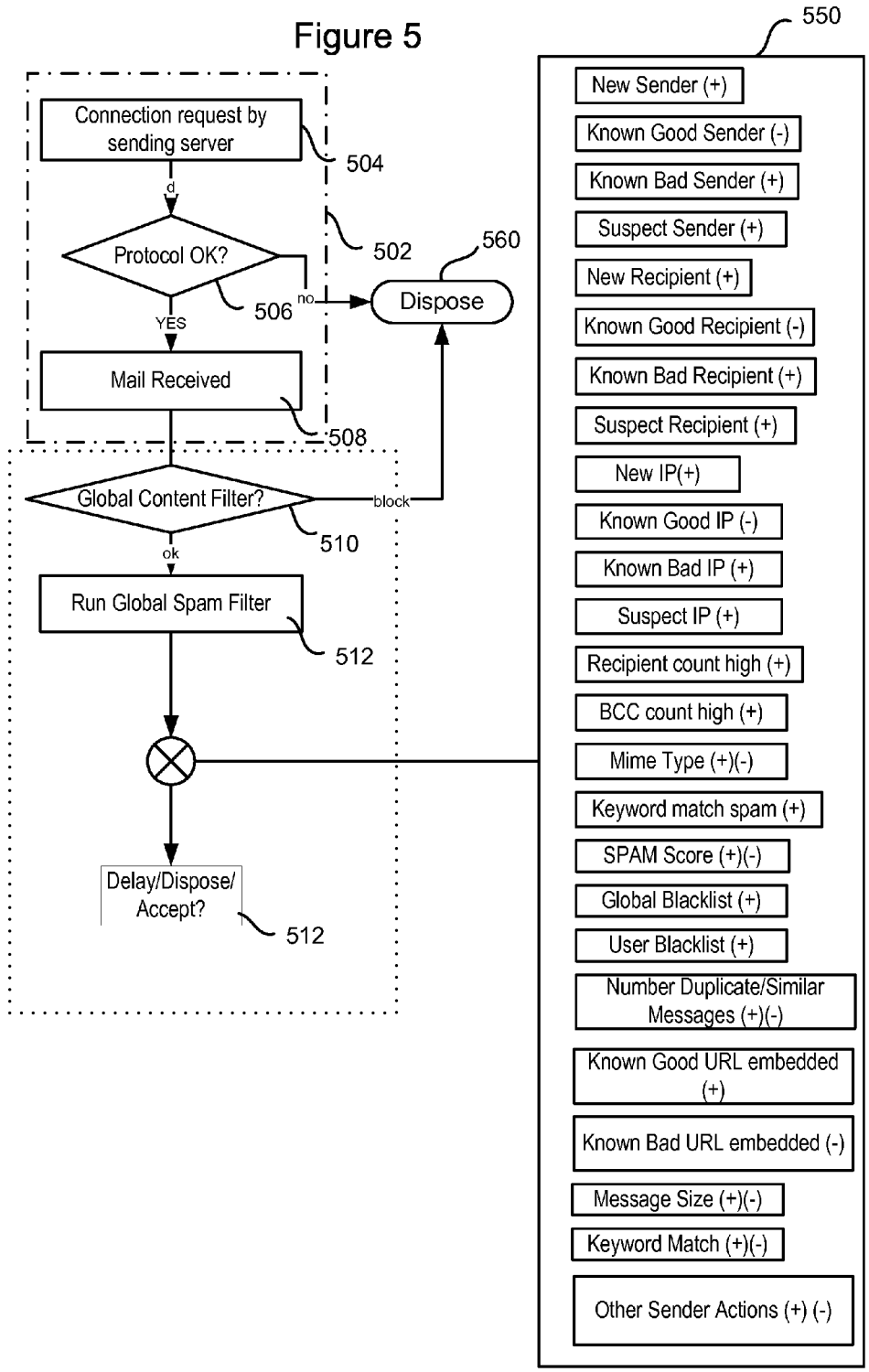
FIG. 5 is a flowchart illustrating a process for determining a suspect message or message stream in accordance with the present technology.

FIG. 5 is a depiction of the evaluation steps performed at any of steps 202, 214, 302, 314, 408, 418, 442, 424 above. At step 502, an initial protocol check on the message may be made. The protocol determination is primarily relative to inbound messages. Step 502 may involve receiving a connection request from a sending server at 504, determining whether the protocol of the connection meets requisite standards at 506, and allowing receipt of the mail at the inbound server at 508. At 510 and 512, respectively, a scan by the global content filter and the global spam filter may result in clear indications that the message is UBE and result in a disposal at 560.

If the SPAM filter and content filter do not dispose of the message, any classifier may sum factors such as those illustrated at 560 to compute a weighted score which, when compared to a threshold, may determine whether to delay a message. Factors 560 are listed in no particular order. A plus (+) sign indicates a characteristic making the email more likely to be UBE, while a minus (−) factor indicates a characteristic making the email less likely to be UBE. Different weights may be assigned to each factor, and more or fewer factors may be utilized in determining whether to initiate a delay, dispose or allow the message or messages sharing identical characteristics. Any one of the factors may be assigned a weight sufficient that the presence of such factor alone may classify a message as suspect or deliverable.

The characteristics may be broadly classified as sender information (e.g. the sender's identity and reputation); recipient information (e.g. the recipient's identity and reputation); message specific characteristics (e.g. recipient count, BCC count, message size, MIME types, keywords); other sender actions (e.g. if the sender outputs a few messages or several hundred messages); and may also include random or deterministic samplings.

FIG. 6 illustrates an example of a suitable computing system environment 600 such as a computer suitable for implementing any of the processing devices or servers described herein.

With reference to FIG. 6, an exemplary system for implementing the technology includes a general purpose computing device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 610. Communication media typically embodies computer readable instructions, data structures, program modules or other data and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 may also include other removable/non-removable, volatile/nonvolatile computer storage media. By way of example only, FIG. 6 illustrates a hard disk drive 640 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 20 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through an output peripheral interface 690.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

The technology is operational with numerous other general purpose or special purpose computing system environments or configurations. Examples of well known computing systems, environments, and/or configurations that may be suitable for use with the technology include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The technology may be described in the general context of computer-executable instructions, such as program modules, being executed by a computer. Generally, program modules include routines, programs, objects, components, data structures, etc. that perform particular tasks or implement particular abstract data types. The technology may also be practiced in distributed computing environments where tasks are performed by remote processing devices that are linked through a communications network. In a distributed computing environment, program modules may be located in both local and remote computer storage media including memory storage devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The foregoing detailed description of the system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the system in various embodiments and with various modifications as are suited to the particular use contemplated. It is intended that the specific features and acts described above are disclosed as example forms of implementing the claims.

What is claimed is:

1. A computer implemented method for safeguarding users from unwanted bulk email messages (UBE) in an email system, the method comprising:
   monitoring messages passing through the email system;
   determining whether a message passing through the email system exhibits characteristics matching one or more characteristics associated with unwanted bulk email messages (UBE);
   determining based on the characteristics exhibited by the message to delay the message;
   delaying the message for a delay period of time, said delaying includes determining an amount of the delay period according to the characteristics giving rise to the determination to delay the message, said amount of the delay period determined varies with the type of characteristics evaluated;
   determining whether to deliver the message based on additional information received during the delay period characterizing the message;
   disposing of the message based on the determining step;

monitoring messages received from senders external to the email system and received by the email system;

monitoring messages generated by users of the email system and destined for recipients external to the email system; and monitoring messages received from users of the email system and destined for other users of the email system.

2. The method of claim 1 wherein the step of disposing includes one of:

delaying the message for a second delay period and determining whether to deliver the message based on addition information received during the second delay period;

delivering the message; or destroying the message.

3. The method of claim 1 wherein the characteristics comprise one or more of: sender information recipient information; message specific characteristics; and a random sampling.

4. The method of claim 1 wherein the method further includes queuing the message during the delaying period.

5. A computer implemented method for safeguarding users from unwanted bulk email messages (UBE) in an email system, the method comprising:

monitoring messages passing through the email system;

detecting a plurality of messages passing through the email system exhibiting characteristics matching one or more characteristics associated with unwanted bulk email messages (UBE);

determining based on the characteristics exhibited by the plurality of messages to delay at least a portion of the plurality of messages, said determining includes calculating a weighted sum of one or more factors and comparing the weighted sum of the one or more factors to a threshold to determine whether to delay the at least a portion of the plurality of messages based on said comparison;

delaying the at least a portion of the plurality of messages for a delay period, said delaying includes determining an amount of the delay period based on the characteristics giving rise to the determination to delay the at least a portion of the plurality of messages;

determining whether to deliver the at least a portion of the plurality of messages based on additional information characterizing messages received during the delay period;

disposing of the at least a portion of the plurality messages based on the determining step;

monitoring messages received from senders external to the email system and received by the email system;

monitoring messages generated by users of the email system and destined for recipients external to the email system; and monitoring messages received from users of the email system and destined for other users of the email system.

6. The method of claim 5 wherein delaying at least a portion includes delaying all messages having identical characteristics.

7. The method of claim 5 wherein delaying at least a portion includes delaying a fraction of the plurality of messages having identical characteristics.

8. The method of claim 7 wherein determining whether to deliver at least the portion of the plurality of messages includes using additional information comprising feedback on a fraction of the plurality of messages not delayed.

9. The method of claim 8 wherein the additional information includes one of user action feedback or message delivery information.

10. The method of claim 9 wherein the step of disposing includes one of:

delaying the messages for a second delay period and determining whether to deliver the message based on addition information received during the second delay period;

delivering the messages; or destroying the messages.

11. A computer implemented method for safeguarding users from unwanted bulk email messages (UBE) in an email system, the email system including an inbound mail server, an outbound mail server and an internal mail server, the method comprising:

monitoring messages passing through the email system at each of the inbound, outbound and internal mail servers;

determining whether a group of messages passing through the email system exhibits identical characteristics that match one or more characteristics associated with unwanted bulk email messages (UBE);

determining based on the characteristics exhibited by the group of messages to delay at least a portion of the group of messages;

delaying the at least a portion of the group of messages for a first delay period of time, said delaying includes determining the amount of the first delay period based on the characteristics giving rise to the determination to delay the at least a portion of the group of messages, said first delay period varies with the type of characteristics evaluated;

determining whether to deliver the at least a portion of the group of messages based on additional information received during the first delay period on whether the characteristics indicate the message is unwanted bulked email messages (UBE);

disposing of the at least a portion of the group of messages based on the determining step, said disposing includes delaying the at least a portion of the group of messages for a second delay period and determining whether to deliver the at least a portion of the group of messages based on addition information received during the second delay period;

monitoring messages received from senders external to the email system and received by the email system;

monitoring messages generated by users of the email system and destined for recipients external to the email system; and monitoring messages received from users of the email system and destined for other users of the email system.

12. The method of claim 11 wherein the one or more characteristics comprise one or more of: sender information recipient information; message specific characteristics; or a random sampling.

13. The method of claim 11 wherein the delaying the at least a portion of the group of messages for a first delay period of time includes delaying all messages of the group of messages having identical characteristics.

14. The method of claim 11 wherein the delaying the at least a portion of the group of messages for a first delay period of time includes delaying a fraction of the group of messages having identical characteristics.

15. The method of claim 14 wherein determining whether to deliver at least the portion of the group of messages includes using additional information comprising feedback on a fraction of the group of messages not delayed.

16. The method of claim 15 wherein the additional information includes one of user action feedback or message delivery information.

17. The method of claim 16 wherein the step of disposing includes one of:
   delivering the messages; or
   destroying the messages.

\* \* \* \* \*